(12) United States Patent
Swanson et al.

(10) Patent No.: US 9,680,567 B2
(45) Date of Patent: Jun. 13, 2017

(54) FAULT LOCALIZATION AND FIBER SECURITY IN OPTICAL TRANSPONDERS

(75) Inventors: Eric A. Swanson, Gloucester, MA (US); Graeme Pendock, Carlisle, MA (US)

(73) Assignee: Acacia Communications, Inc., Maynard, MA (US)

( * ) Notice: Subject to any disclaimer, the term of this patent is extended or adjusted under 35 U.S.C. 154(b) by 1024 days.

(21) Appl. No.: 13/410,896

(22) Filed: Mar. 2, 2012

(65) Prior Publication Data

US 2012/0224846 A1 Sep. 6, 2012

Related U.S. Application Data

(60) Provisional application No. 61/448,835, filed on Mar. 3, 2011.

(51) Int. Cl.
*H04B 10/07* (2013.01)

(52) U.S. Cl.
CPC .................. *H04B 10/0705* (2013.01)

(58) Field of Classification Search
CPC ................ H04B 10/079; H04L 43/106
USPC .................... 398/140, 154, 155, 10
See application file for complete search history.

(56) References Cited

U.S. PATENT DOCUMENTS

| | | | | |
|---|---|---|---|---|
| 5,949,759 A | * | 9/1999 | Cretegny et al. | 370/250 |
| 6,222,652 B1 | * | 4/2001 | Roberts | H04B 10/077 398/155 |
| 6,253,339 B1 | * | 6/2001 | Tse | H04Q 3/0075 370/216 |
| 6,374,021 B1 | * | 4/2002 | Nakanishi | G02B 6/4246 385/49 |
| 6,512,616 B1 | * | 1/2003 | Nishihara | 398/54 |

(Continued)

OTHER PUBLICATIONS

Thottan et al, Anomaly Detection in IP Networks, Aug. 2003, IEEE Transactions on Stignal Processing, vol. 51, No. 8, pp. 2191-2204.*

(Continued)

*Primary Examiner* — David Payne
*Assistant Examiner* — Tanya Motsinger
(74) *Attorney, Agent, or Firm* — Wolf, Greenfield & Sacks, P.C.

(57) ABSTRACT

Designs, methods, and applications for fault localization and fiber security in optical transponders is described. In one embodiment a two-way time transfer protocol or other suitable method for synchronizing clocks between distant transponders is used. The clock synchronized transponders have digital signal processing to continually detect high precision time-histories of physical layer attributes in the transmission between the two transponders. Physical layer attributes can include: state-of-polarization changes, changes in polarization-mode-dispersion, change in propagation delay, changes or loss-of-light, changes in OSNR, changes in BER between the two nodes. By recording these physical layer changes and time-stamping them information on the magnitude and estimated location of the changes can be inferred by from the time records. In one aspect the method may be used in a distributed optical sensor for monitoring trespassing events that are a risk to fiber security of an optical transmission link.

20 Claims, 6 Drawing Sheets

(56) References Cited

U.S. PATENT DOCUMENTS

| | | | | |
|---|---|---|---|---|
| 7,406,260 B2* | 7/2008 | MacDonald | H04L 41/0659 | 370/241 |
| 7,613,212 B1* | 11/2009 | Raz | H04J 3/0641 | 370/510 |
| 7,808,915 B2* | 10/2010 | Clark | H04L 41/065 | 370/242 |
| 7,830,806 B2* | 11/2010 | Rayner | H04L 12/24 | 370/216 |
| 8,320,760 B1* | 11/2012 | Lam et al. | | 398/66 |
| 8,855,496 B2* | 10/2014 | Rajagopal | H04B 10/1149 | 398/128 |
| 2003/0113118 A1* | 6/2003 | Bartur | H04B 10/0771 | 398/139 |
| 2008/0052387 A1* | 2/2008 | Heinz et al. | | 709/223 |
| 2009/0116845 A1* | 5/2009 | Li | H04B 10/077 | 398/135 |
| 2009/0269053 A1* | 10/2009 | Yang | | 398/22 |
| 2009/0297164 A1* | 12/2009 | Horiuchi | H04J 3/0682 | 398/154 |
| 2010/0316372 A1* | 12/2010 | Chang | H04B 10/0771 | 398/12 |
| 2011/0026394 A1* | 2/2011 | Feng | H04L 12/437 | 370/217 |
| 2011/0052206 A1* | 3/2011 | Zheng | H04J 3/0697 | 398/154 |
| 2011/0262133 A1* | 10/2011 | Yuan | H04J 3/0667 | 398/43 |
| 2012/0052812 A1* | 3/2012 | Frei | | 455/63.1 |
| 2014/0133844 A1* | 5/2014 | Dahlfort | H04L 43/0811 | 398/10 |
| 2014/0133845 A1* | 5/2014 | Dahlfort | H04B 10/0771 | 398/12 |
| 2014/0169792 A1* | 6/2014 | Lee | H04J 3/0673 | 398/66 |

OTHER PUBLICATIONS

Rouvellou et al "Automatic Alarm Correlation for Fault Identification", Apr. 2-6, 1995, IEEE, vol. 2, 553-561.*

"Modem." Merriam-Webster.com. Merriam-Webster, n.d. Web. Aug. 18, 2015. <http://www.merriam-webster.com/dictionary/modem>.*

* cited by examiner

FAULT LOCALIZATION AND FIBER SECURITY IN OPTICAL TRANSPONDERS

CROSS REFERENCE TO RELATED APPLICATION

This application claims priority from the U.S. Provisional Patent Application No. 61/448,835 filed on Mar. 3, 2011.

BACKGROUND OF THE INVENTION

Field of the Invention

This invention relates generally to the field of optical transmission systems, and more particularly to optical transceivers used in optical transmission systems that use analog and digital signal process (DSP) and time synchronization techniques to predict, detect, and localize faults or other impairments to an optical fiber transmission link resulting from damage or tampering or a transmission link that is configured as a distributed sensor.

Related Art

In optical fiber transmission systems it is important to be able to predict, detect, and locate faults resulting from link damage or tampering along a transmission path. There exists a variety of methods to accomplish these tasks. For example, if a back-hoe accidentally cuts a transmission fiber conduit and severs a pair of transmission fibers, the receivers and amplifier nodes typically would have 'loss-of-light' indicators to notify the fault. Once a fault is detected often a crew is dispatched with an Optical Time Domain Reflectometer (OTDR) to locate the fiber cut and a repair crew is dispatched to fix the break. While the fault itself can be detected quickly, its location cannot be easily identified precisely (e.g., not better than a typical amplifier-to-amplifier distance of about 100 km) unless expensive equipment such as an OTDR is dedicated to each link. Furthermore, if there are multiple transmission fiber pairs between each link then multiple OTDRs may be required at additional real-estate, power, maintenance and cost.

Fiber cuts result in abrupt traffic outage and is therefore immediately noticeable and can be located within an amplifier but distance with simple techniques using network management protocols that are usually transmitted over a dedicated communication link that is entirely different (out of fiber) and operated at a different wavelength than the wavelength of the signal channels. Slowly occurring degradation in transmission quality resulting from impairments that are not easily noticeable such as, an event of malicious tampering of an otherwise secured transmission link by a third party for eaves dropping, are more difficult to detect. To improve security of installed transmission links, accurate and fast methods are required for detecting and precisely locating impairments and events of tampering as soon as they occur.

FIG. 1 shows an example of a prior art optical fiber transmission link 100. A typical optical fiber link comprises at least two terminals 101 and 102, connected by fiber links 103 (only one labeled for clarity) and repeater or amplifier huts 104 (only one labeled for clarity) placed at predetermined distances throughout the link. The terminals include electrical and optical transmission and switching equipment such as transponders, optical and electrical multiplexers, routers, memory and processors or computers, timing equipment, optical amplifiers, etc. Also shown below the terminal 101 is a simplified example of a DWDM (Dense Wave Division Multiplexed) transponder. Such a transponder may include a short reach interface 112 that goes to customer equipment such as a router or a switch and a DWDM interface 114 that transmits a specific wavelength(s) signals across the optical fiber link.

The optical fiber link may be placed in a network including, but not limited to a local area, a metro, a regional, or a long haul network having one or more network nodes, each node further having multiple terminals and transponders. The terminals also have other signal processing equipment 113 that perform pre-processing and post processing functions such as, framing, forward error correction (FEC), multiplexing/de-multiplexing in optical and/or electrical domain, Polarization Mode Dispersion (PMD) compensation, and other functions that are well known in the art. Not shown in FIG. 1 is that there may be 80 or more wavelengths that are optically multiplexed from multiple transponders to be transmitted on one fiber.

Also shown in FIG. 1 are different types of amplifier but designs for 2-fiber unidirectional system 114a-114c and 1-fiber bidirectional system 124a-124c, as is known in the art. One fiber systems have some advantages in that the propagation delay between the two terminals is identical and 2 fiber systems have advantages in that more information can be transmitted. The systems 114a and 124a show an amplifier but having a traditional two-stage EDFA (Erbium Doped Fiber amplifiers) 115 and 125, respectively, with mid-stage access for dispersion compensating fiber (DCF) 116 and other devices (not shown in this view). The middle row shows an alternate amplifier but design 114b and 124b with only amplifiers (115 and 125, respectively) that do not need mid-span DCF such as those used in 100 G DP-QPSK coherent transponder systems. The bottom row shows another type of amplifier but design 114c and 124c having no amplifiers or a distributed Raman Pumped amplifier for long haul transmission systems.

While a back-hoe near a distant amplifier but may cut the fiber and take down all the communication channels in a very noticeable and abrupt way, a malicious determined third party might be much more sinister in its ability to individually select one fiber to tap some of the light for eaves dropping or other malicious intentions such as spoofing or jamming. Such occurrences can happen anywhere along the fiber link including at the amplifier huts. They are very difficult and expensive to detect with technology solutions currently available.

This invention provides transponder with advanced capabilities and clock synchronization methods that may be applied in installed DWDM transmission links for in-situ monitoring of fault prediction, detection, and locating faults that may occur due to link damage or due to tampering, whether inadvertent or intentional. Advantageously, the methods according to this invention do not add significantly to equipment or operational cost of the transmission system. The concepts described in this invention may also be used to create a distributed sensor application. Such sensors may be used for example in surveillance applications to detect and localize external events such as people or vehicles passing over a section of a fiber optic link.

SUMMARY OF THE INVENTION

In one aspect of the invention a method to detect faults and/or transmission link security is provided. One particular aspect relates to apparatus and methods for synchronizing timing or clocks between two transponders connected at two end points of an optical transmission link. By utilizing precise timing and having knowledge of the transmission delay between the end terminals sophisticated algorithm detect and locate faults resulting from natural causes or due to tampering or for detecting external events where the fiber is used as a distributed sensor. Another aspect of the invention relates to determining the total delay on a unidirectional or bidirectional fiber link and using detected changes in that delay as an indicator of tampering. One convenient method is to include a simple low-cost two-way time transfer (TWTT) protocol in a coherent optical transceiver by incorporating memory devices and capability for sophisticated analog and Digital Signal Processing (DSP) methods.

In one embodiment, a TWTT protocol is used to synchronize clocks located in transceivers at two end points of an optical fiber transmission link. The clock synchronized transceivers record a time sequence of one or more measurements of optical link parameters. Optical link parameters include, but are not limited to Bit Error Ratio (BER), Optical Signal to Noise Ratio (OSNR), signal power, state of polarization, ratio of X&Y polarization amplitudes, polarization mode dispersion (PMD), chromatic dispersion (CD), transmission delay, and more. By recording a time history of these link parameters in reference with a precisely synchronized clock timing, if one or more of these parameters change in an uncharacteristic or unusual fashion (such as occurs with a fiber cut or tamper and eaves drop on a secure communication link or in an event of trespassing over a distributed fiber sensor) a fault may be predicted or an event may be precisely localized. In one variant embodiment of the transceiver design, a transceiver is provided with the capability to determine a location and type of fault and transmit the information to a network operator.

In one variation of the invention a transceiver is provided with digital and/or analog signal processing capabilities for performing tasks that correct for signal impairments in transmission links. By processing data obtained from the transceiver and other parts of the transmission link and generating statistical analysis of acceptable range of impairments. Using such data, a network operator determines any anomaly in the data and, derives important information to predict and locate a fault resulting from natural disruption or tampering, whether unintentional or malicious.

Another aspect of this invention relates to using coherent transponders such as DP-QPSK, DP-QAM, or OFDM transponders that have sophisticated digital signal processing (DSP) to correct for fiber impairments such as polarization rotation, polarization mode dispersion, and chromatic dispersion. Such DSP algorithms inherently correct for these continually varying fiber characteristics. By modifying the DSP algorithms to report these parameters to a processing unit, and the processing unit in combination with the previously mentioned time synchronization algorithms can predict, detect and precisely locate the nature and position of natural or man-made problems that are innocent or malicious in their intent, in near real-time or post-processing non-real-time.

In one embodiment of the invention a distributed optical sensor is provided where a distributed optical transmission link including at least one transponder at each end of the distributed transmission link is configured with an embedded two way time transfer protocol that can detect and report an anomalous variation in the transmission parameters indicative of a fault or tampering, whether inadvertent or with a malicious intent. In one aspect of the invention, a distributed sensor may be used for monitoring and surveillance applications for example, monitoring a secured premise for human or vehicular trespassing.

BRIEF DESCRIPTION OF THE DRAWINGS

A broad framework of the invention will be better understood by referring to the specification in conjunction with the accompanying drawings. The drawings are not necessarily to scale, emphasis instead generally being placed upon illustrating different principles embodied in the description of the invention. In the drawings, FIG. 1 schematically represents a prior art fiber optical transmission system including a dense wavelength division multiplex (DWDM) transponder.

DETAIL DESCRIPTION OF THE INVENTION

Referring once again to FIG. 1, it may be envisioned that there are many installation scenarios for example, local, metropolitan, regional, or long-haul links that may be of interest to system vendors and their end customers who are telecommunication companies, cable operators, data centers, government organizations, etc. The DWDM systems may use a variety of types of fiber (standard, dispersion shifted, Truewave™), different types of amplifiers (single stage, multiple stages with or without mid-stage access, Raman-end pumped systems, etc.), and be unidirectional or bidirectional systems as is known in the art.

This invention can be applied to any transmission link and will be described in few representative embodiments. The preferred embodiments illustrate a general broad framework of the invention, and the methods outlined here may be applied in different combinations, sub-combinations and modifications in commercial and military networks for applications including, but not limited to optical communication, monitoring, surveillance, etc. In addition one aspect of this invention is not primarily a communication system at all but can be a distributed fiber sensor that is used to detect external environmental events such as a person or vehicle crossing a fiber links or other environmental disturbance along a fiber link.

Figure 1:
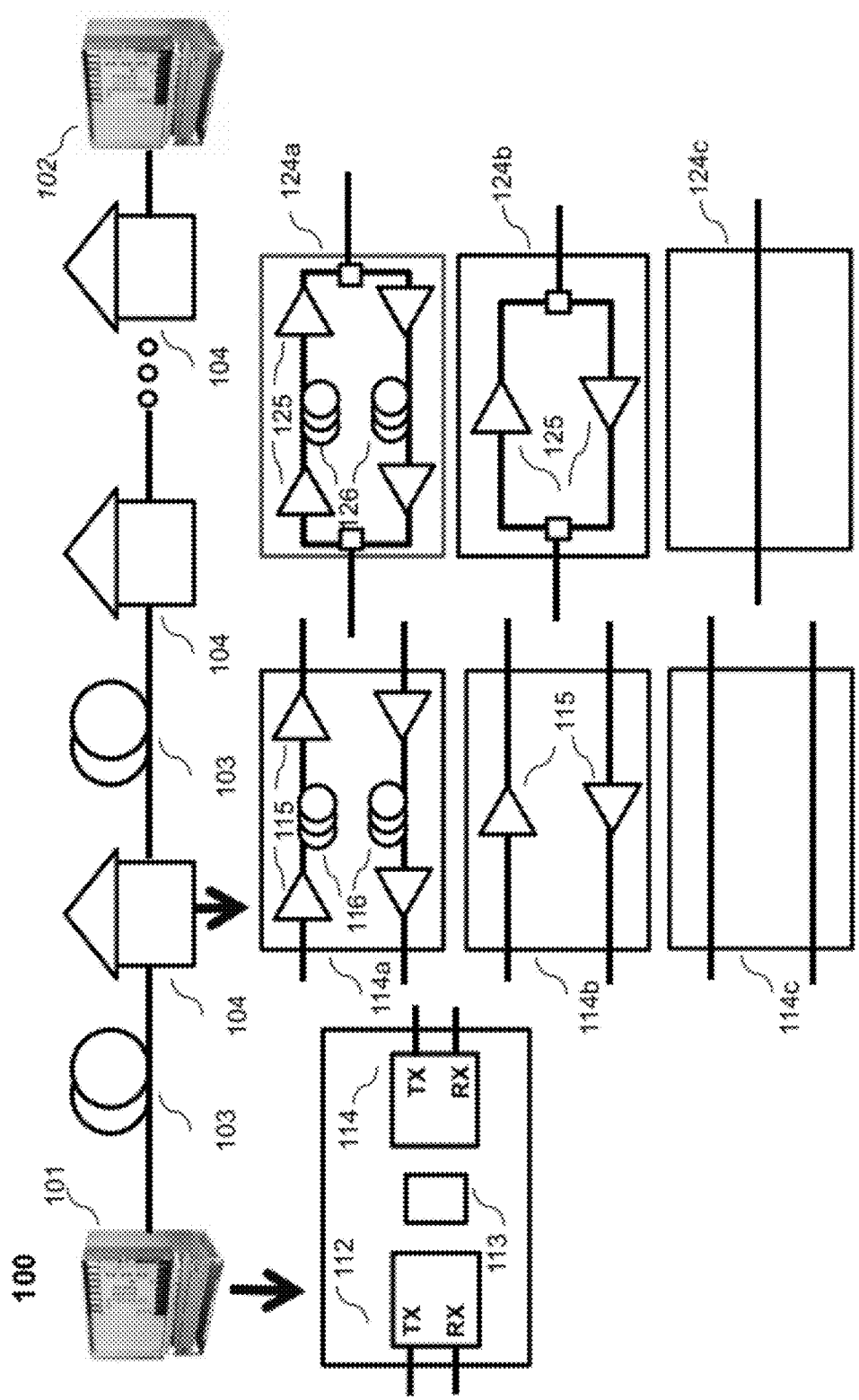

In transmission networks such as the one shown in FIG. 1, monitoring tasks that include time stamping, fault detection, etc. is performed by network management using a dedicated channel configured separately from the main signal channels. One aspect of this invention is to include timing synchronization functions in the transponders at each end of an optical fiber transmission link such that each transponder has knowledge of one or more synchronized clock associated with its link. In a preferred embodiment of the invention a two-way time transfer (TWTT) protocol is embedded in the transponders placed at different terminal nodes. If there is more than one transmission pair between distant terminal nodes the timing synchronization can be preferably performed for each link or it is also possible that the timing synchronization system is centralized and the information is shared on the transponders located at the same terminal nodes.

There are many ways to obtain synchronized clocks at distant nodes. One possible way is to accurately synchronize atomic clocks at a central location and bring them to each terminal and have a timing network distribute that clock to the various transponders. Another method is to have an external source of timing that is accessible by the distant terminal nodes, for example from GPS satellite or other RF broadcast signal, to acquire synchronized clocks and distribute those clocks to the various transponders.

Figure 2:
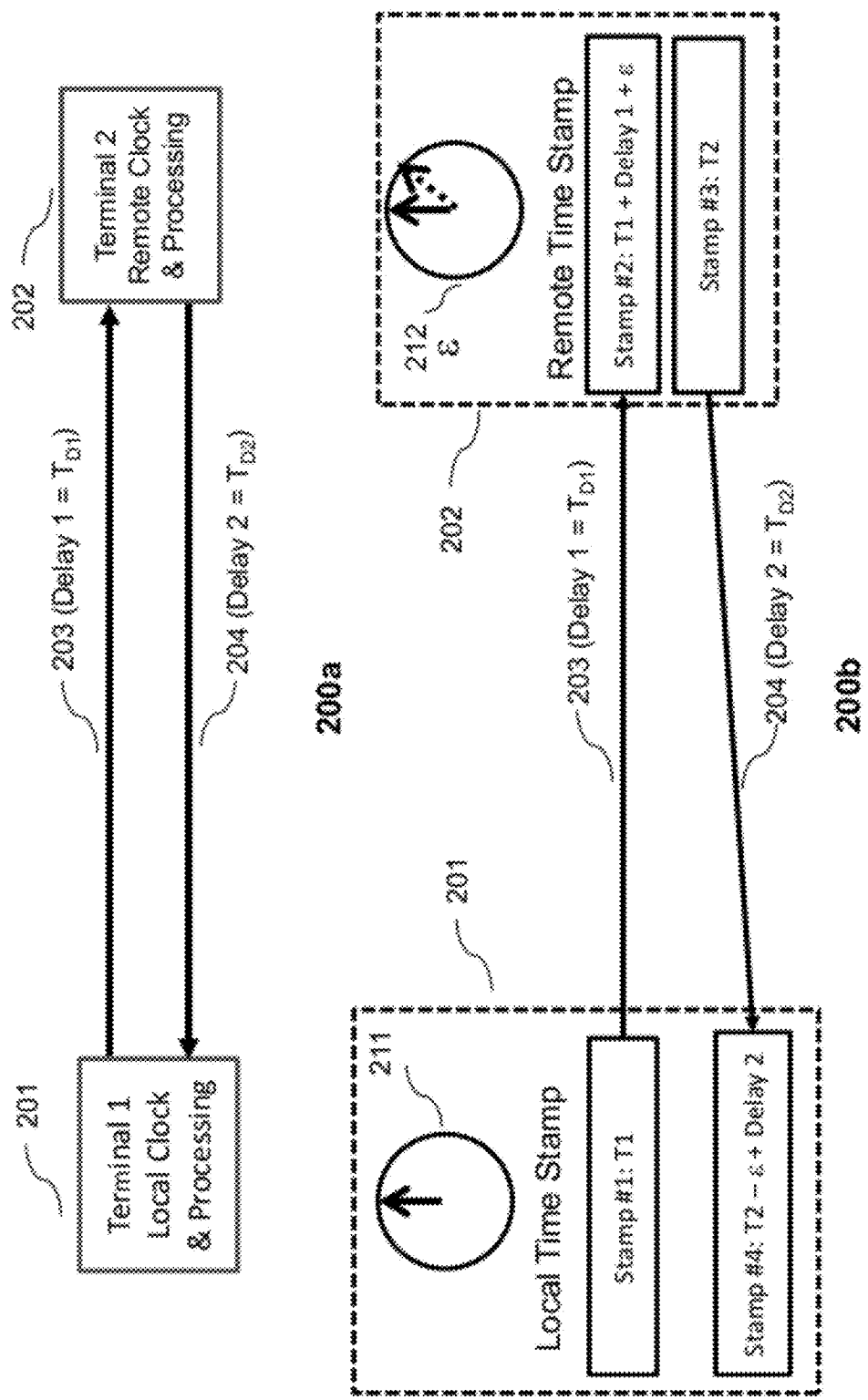
FIG. 2 is a schematic block diagram of a basic Two Way Time Transfer (TWTT) protocol implementation as applied in this invention.

FIG. 2 shows a preferred configuration to implement a two-way time transfer (TWTT) protocol that may be embedded in a transponder to synchronize clocks at each end of a transmission link. TWTT protocols are well known in the art. A TWTT may be included in a transceiver or alternatively the TWTT can be built into a separate part of the transponder module. The basic premise of the protocol applied in this invention is illustrated in two different variant forms shown as 200a and 200b, respectively. In the configuration illustrated in 200a, a TWTT protocol is implemented between a local clock located at one terminal 201 (referred as Terminal 1 or Local terminal) and a remote clock located at a second terminal 202 (referred as Terminal 2 or Remote terminal). To synchronize the clocks at the two ends, a time transfer modem generates a time-based waveform coherent with the timing signals provided by one of the clocks for example, by the clock at the Local terminal.

A time-stamped signal transmitted from Terminal 1 (Local terminal) to Terminal 2 (Remote terminal) over a link 203 is received at the Terminal 2 with a propagation delay (Delay 1) corresponding to link 203. The Terminal 2 after receiving the time-stamped signal from Terminal 1 sends another time-stamped signal back over a link 204 which is received with a propagation delay (Delay 2) corresponding to the link 204. The time transfer modem at the local terminal then measures the relative time between, when the signal was transmitted and when the signal from the opposite side was received. The offset between the two clocks is determined using Equation 1.

$$\text{Remote Clock Delay} = (\text{Measure}_{Remote} - \text{Measure}_{Local})/2 \quad\quad 1$$

where:

Measure$_{Local}$=Time difference measurement at the local clock which is the difference in the time-stamped remote transmission received at the local terminal (basically sum of measured time at the remote clock with its Remote Clock Delay minus propagation delay).

Measure$_{Remote}$=Time difference measurement at the remote clock which is the difference in the time-stamped local transmission received at the remote terminal (basically sum of measured time at the remote clock with its Remote Clock Delay plus propagation delay), and $T_D$=propagation delay is defined as time of flight of light from one terminal to the other.

There are various known constraints and various embodiments of TWTT protocols. One constraint is that the propagation delay of the transmitted signal is assumed to be the same in both directions. It may not always be the case. If it is not the same, then there are errors in time synchronization. For example, if there is a difference of 1 meter between the two links (203 and 204) then the final fault/tampering locating algorithm will only be accurate to the order of 1 meter. The accuracy to which the clocks in the distant nodes are calibrated, in part determines the accuracy of fault location. For example, assuming that the speed of light in an optical fiber is roughly $2 \times 10^8$ m/s if the clocks are synchronized to 10 ns, then the accuracy with which the clocks in the distant node can determine fault location is of the order of 2 meters. For optical links including multiple fibers having lengths between 10's and 1000's of kilometers, locating a fault even within 100 meters is very valuable to a network operator.

A different TWTT method for synchronizing clocks between two terminals is illustrated in the schematic 200b at the bottom of FIG. 2. Terminal 1 (Local terminal) and Terminal 2 (Remote terminal) are represented as 201 and 202, respectively, by dashed boxes showing their respective clocks 211 and 212, and sequences of time stamps marked within the rectangular boxes. The time transfer is affected by transmitting time-stamped signal over links 203 and 204 in opposite directions indicated by the respective arrows. In this method, it is assumed that clock 212 is not synchronized correctly, and that it has a time error thereby, reading a time that is $\epsilon$ ahead of time read by the clock 211. In this example the time transfer modem at the Local terminal 201 measures the relative time between clocks 211 and 212, respectively, in the following sequence—

At time T1, Terminal 1 transmits a time-stamped signal indicating its clock in a specially marked frame in the outgoing data stream to Terminal 2;

At time T1 plus a delay (Delay 1) equal to the propagation delay of the link 203, Terminal 2 detects the specially marked frame and time stamps the received signal with its clock. The Terminal 2 time stamp is equal to T1+$T_{D1}$+$\epsilon$, where $T_{D1}$ is the propagation delay in the link 203, and $\epsilon$ represents an error if any, in the clock 212. This information pair is sent to a central processing unit which can be located at Terminal 1 or Terminal 2 or elsewhere;

At time T2 Terminal 2 transmits a time-stamped signal indicating its clock in a specially marked frame in the outgoing data stream on link 204 to Terminal 1;

At time T2 plus a delay (Delay 2) minus $\epsilon$, Terminal 1 detects the specially marked frame and time stamps the received signal with its clock, where Delay 2=$T_{D2}$ is the propagation delay in the link 204. The Terminal 1 time stamp is equal to T1+$T_{D2}$-$\epsilon$. The time measurement information may be sent to a central processing unit which can be located at Terminal 1 or Terminal 2 or elsewhere.

A mathematical algorithm is applied to extract the estimated Terminal 2 clock time error. This clock error is communicated to Terminal 2's clock and used to adjust Terminal 2's clock to synchronize to Terminal 1 clock.

This algorithm can be run once, periodically run, or continually run to ensure the clocks stay synchronized to the required tolerances. For example if the clock synchronization error in Terminal 2 relative to Terminal 1 is very small, and $T_{D1}$ is approximately equal to $T_{D2}$, then the delay can be estimated as—

$$\begin{aligned}\text{Remote Clock Delay} &= [(\text{Stamp \#2} - \text{Stamp \#1}) - \\ &\quad (\text{Stamp \#4} - \text{Stamp \#3})]/2 \\ &= [((T1 + T_{D1} + \varepsilon) - T1) - \\ &\quad ((T2 + T_{D2} - \varepsilon) - T2)]/2 \\ &= [(T_{D1} + \varepsilon) - (T_{D2} - \varepsilon)]/2 \\ &= \varepsilon + \frac{(T_{D1} - T_{D2})}{2}\end{aligned} \quad (2)$$

If $T_{D1}$ and $T_{D2}$ are approximately equal, then the error in Terminal 2 clock delay is approximately equal to $\epsilon$.

In is important that the stability of each Terminals' clock be very good so that once they are synchronized the drift in clocks is very small and the TWTT protocol does not need to run at rapid rates. Once two or more terminals have synchronized clocks it is straightforward for each transmission pair to determine the time delay between them. There are many ways to determine path delay.

For example if the clock synchronization error in Terminal 2 relative to Terminal 1 is very small, and $T_{D1}$ is approximately equal to $T_{D2}$, then the delay can be estimated as—

Delay=$T_D$~[(Stamp #2−Stamp #1)+(stamp #4−Stamp #3)]/2.

Figure 3:
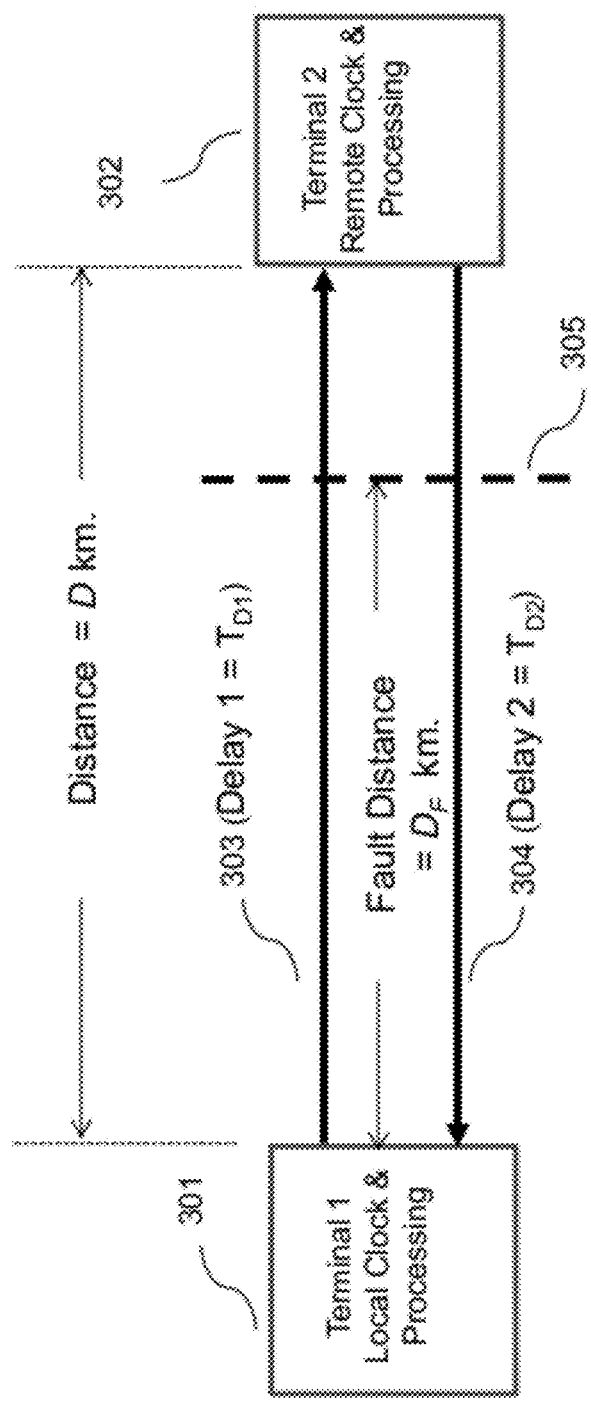
FIG. 3 is a schematic block diagram set up illustrating concept of applying a TWTT protocol for locating a fault along a transmission link.

FIG. 3 illustrates an application of timing synchronization by TWTT between a pair of transponders participating in bidirectional communication system for locating a fault in a transmission link. More specifically, FIG. 3 shows a pair of terminals 301 and 302 serving as Terminal 1 (Local terminal) and Terminal 2 (Remote terminal), respectively. The terminals are equipped with their respective clocks that may be synchronized by implementing TWTT as described in the previous section, or using other methods described earlier. The terminals are at a distance of D km apart and are connected with two-way links 303 and 304, respectively.

In one exemplary scenario, a fault occurs at a distance $D_F$ from Terminal 1 which is shown as a broken line 305 in FIG. 3. The fault may occur due to a fiber cut or any other event such as, malicious tampering, or in a distributed sensor application it could be a person, vehicle, or some environmental disturbance near the fiber at location 305, etc. If each transponder is recording a time history of events that are at least as long as the propagation delay $T_D$ (or preferably much longer), then the network management system can estimate the location of a fault according to a sequence outlined below:

The time at which a loss of the light (or any alteration) is detected at the Remote terminal (Terminal 2) will be prior to the time at which the same event will be detected at the Local terminal (Terminal 1) since the time the light has to travel from the cut to Terminal 2 is shorter than the time the light has to travel from the cut to Terminal 1. It must be noted that this may change depending upon the distance of the fault from Terminal 1 or Terminal 2. In the case of a bidirectional fiber transmission system, the path lengths are nearly identical. For unidirectional systems there may be slight errors as noted earlier but there is still sufficient accuracy in this approach to localize the fault over a long link such as the one shown in FIG. 3.

A simplified expression for fault localization in this example assuming matched fiber delays and a perfect simultaneous unidirectional fiber transmission system is as follows.

$$D_F = D \times [1+(T_L-T_R)/(T_D)]/2 \qquad 3$$

where—

$D_F$ is the distance between the fault location and the Local terminal 301, D is total link distance, $T_L$ is the time when transmission loss is recorded at the Local terminal (Terminal 1), $T_R$ is the time when transmission loss is recorded at the Remote terminal (Terminal 2), and $T_D$ is the total propagation delay assumed to be the same for the two transmission links 303 and 304. In this example it is assumed that the clocks do not have any error and they are synchronized using the methods outlined earlier.

To illustrate the principle of fault location in the example shown in FIG. 3, it is assumed that D≅1000 km. Therefore total propagation delay would be about $(1000 \text{ km})/(2 \times 10^8 \text{ m/s})=5$ ms where the term in the denominator is the velocity of light in the transmission fiber. Assuming that the fault occurs at a distance $D_F \cong 900$ km, Distance of the fault from Terminal 1 (in km) =

$1000 \times [1 + ((4.5 \text{ ms} + \text{Time of Cut}) - (0.5 \text{ ms} + \text{Time of Cut}))/5.0 \text{ ms}]/$ $2 = 900 \text{ km}.$ It must be noted that the time at which loss of the light (or an unusual change in the transmission parameter) is recorded at the terminals are not the actual time when the fault occurred because the time at which the fault is recorded at the respective terminals also include a propagation delay that is proportional to the distance between the fault and the respective terminals, which needs to be factored into the fault location estimation.

From this example, those skilled in the art will be able to recognize that in general, the time at which a terminal detects the fault is equal to the time at which the fault occurred and a delay that is proportional to the distance of the fault from the respective terminal. Knowing the total propagation delay of the transmission link without the fault, and by processing of the recorded time history in combination with the recorded event time at each terminal, a network operator can estimate the proportional delay to the fault location from the respective terminal for estimating a fault location.

The above sections illustrate methods for determining the fault location by synchronizing clocks at each end of the link and recording a time history at each terminal, at least for a period that is as long as or longer than the propagation delay in the link. The accuracy to which a fault location is determined depends on the accuracy of clock synchronization and, by accurately sensing and recording of the time a loss in transmission is detected at the transponders at the two ends of a transmission link. While the concept is explained using an example of a fiber cut, the same concept may be extended to other types of faults such as malicious tampering or variations related to change in environmental parameters in distributed fiber sensor applications that do not involve a complete fiber cut.

In a variant embodiment recording the time history of transmission events also provides a means to detect a fault resulting from tampering, whether inadvertent or malicious. More specifically, an accurate measurement and recording of any transmission parameter for example a propagation delay, over a substantive period of time can generate a statistical measure of acceptable range of propagation delay. At a later time any substantial deviation from the acceptable range would indicate that a malicious tampering to insert tapping equipment in the transmission link may have occurred. Thus knowing the acceptable range of total delay and any substantial changes in that delay value, may be an important indicator in monitoring security of the transmission link.

There are many other methods and algorithms that are well known in the art and may be used to perform clock synchronization. These include synchronization to external clocks such as a RF or microwave or satellite clock, as well as algorithms that include in-fiber or out-of-fiber feedback loops. Similarly, there are other methods and algorithms that are known in the art for estimating fault location by detecting loss of transmission at both terminals by using knowledge of the time history and the synchronized clocks. In a prior art transmission system most of these operations are achieved by network management on a separate and dedicated network management channel. More importantly, the data is not processed continuously or at set intervals, unless a loss of transmission is detected and reported by the affected nodes.

One distinguishing aspect of this invention is to provide additional functionalities in the transceivers to continuously and/or periodically perform time synchronization, clock delay measurements so as to detect fault and estimate a position of the fault. Referring back to FIG. 1, many types of DWDM transponders are currently used in a transmission link. The method described in this invention is particularly suited for transmission links that use adaptive receivers in transponders that employ optical coherent receiver technology and have analog or digital signal processing (DSP) technology built in the receiver to correct for impairments in fiber optic channels. There are many types of coherent transponders including, but not limited to QPSK (Quadrature Phase Shift Keying), DP-QPSK (Dual-Polarization-Quadrature Phase Shift Keying), BPSK (Binary Phase Shift Keying), DP-BPSK (Dual Polarization-Binary Phase Shift Keying), QAM (Quadrature Amplitude Modulation), DP-QAM (Dual Polarization-Quadrature Amplitude Modulation), OFDM (Optical Frequency Division Multiplexing), DP-OFDM (Dual-Polarization Optical Frequency Division Multiplexing) and others.

Figure 4:
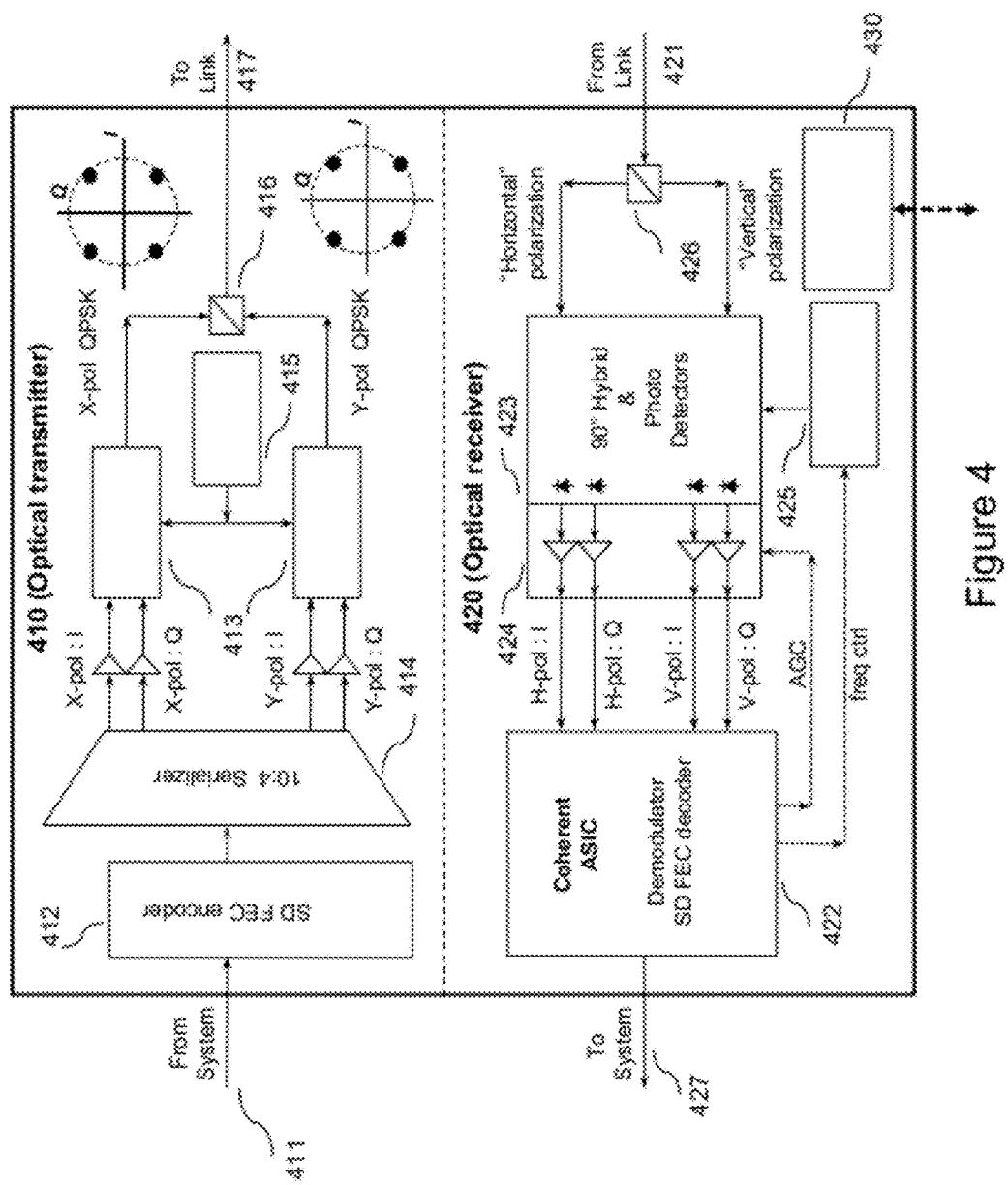
FIG. 4 is a block diagram of a transceiver system including an ASIC with a built-in TWTT protocol system constructed in accordance with this invention.

For illustrative purposes, FIG. 4 shows one example of a DP-QPSK transceiver that may be adapted for implementing the clock synchronization and fault location method described in the earlier sections. However, the basic concepts of this invention apply equally to all types of coherent and non-coherent transceivers. The transceiver shown in FIG. 4 comprises an optical transmitter section 410 and an optical receiver section 420, respectively. For clarity and ease of discussion, the two sections are shown separated with a dotted line in this exemplary embodiment. In practice, the transmitter and receiver sections need not be so markedly separated on an actual transceiver board.

The transmitter section receives an electrical signal 411 from a one or more transmission system component such as, a transport switch, a router line card, etc. The electrical signal is encoded by an encoder 412 using soft-decision forward error correction (SD-FEC) coding in this particular embodiment. In other embodiments, no FEC code, or other types of codes may be used. A 10:4 serializer represented as 414, serializes the output of the SD-FEC for example, into four 30 G streams of electrical signals in this particular embodiment. However, it should not be construed as a limiting factor and other data rate may be selected as well. The transmitter may optionally include (not shown in this view) electrical amplifiers and multichannel Digital to Analog Converters (DAC) for imparting a desired amplitude and wave shape to the electrical signal so as to optimally modulate an optical source 415 which in this example is a laser. The SD-FEC encoder, the 10:4 serializer or the multichannel digital to analog converter (DAC) functions may optionally be performed in an Application Specific Integrated Circuit (ASIC) 422 which is located on the receiver side in this embodiment. The ASIC is a part of the receiver that performs many sensing operations along with implementing the TWTT and fault location tasks in this specific example.

The four streams of electrical signals from the serializer after amplification and wave shaping are sent to two separate QPSK (Quadrature Phase Shift Keying) electro-optical or other non-electro-optical type modulators 413. A transmitter laser 415 is optically connected to the modulators 413 and the two respectively modulated optical signals are combined using a polarization combiner 416. The combined optical output signal is sent to the output link 417. Although the invention is described in reference with a DP-QPSK modulation format, the invention may be implemented equally effectively for other modulation formats such as, a DP-QAM, OFDM or a DP-BPSK, etc.

The receiver section 420 receives a DP-QPSK modulated optical signal from the link 421. It is noted that the modulation format selected to demonstrate the principles of the receiver is only exemplary and other modulation format may be used. The received signal 421 is split in a polarization splitter 426 into horizontal and vertical polarization components. The two optical output signals are sent to a 90 degree hybrid and photo detector module 423 that is well known in the art and will not be described further. A local oscillator (LO) laser 425 is also coupled to the 90 degree hybrid module such that the 90 degree hybrid receives the optical signal and an optical reference (LO) and combines them to produce two signals with different polarizations each with an in-phase and a quadrature differential (or single ended) optical outputs that are received by a photodetector.

From the two optical output signals the 90 degree hybrid and photo detectors generate four signals to be input to an amplifier block 424 including four electrical amplifiers. The amplified signals are further processed in an ASIC (Application Specific Integrated Circuit) 422. As will be described shortly, the multitude of functions performed in the ASIC include, but are not limited to chromatic dispersion correction, polarization mode dispersion correction, descrambling of polarization axes, symbol timing recover, carrier frequency and phase estimation, SD-FEC decoding, and more.

The operation of the transceiver including devices 410 and 420 is monitored and controlled by the device control unit 430 (connections not shown for clarity). The device control unit may also perform data processing for example, generating time stamps, logging timing sequences, timing history of events, running algorithms for estimating clock delays and fault locations are some of them. Although the invention is described using DP-QPSK data format and procedures associated with that particular format, the principles are equally suited for other architectures used for QAM or OFDM or BPSK and are well known to persons having ordinary skill in the art.

The ASIC 422 shown in FIG. 4 is one of the critical components of the transceiver in this particular embodiment of the invention. While the ASIC is shown to be a part of the receiver section 420, it may preferably include parts of the transmitter logic in it as well (for example the SD-FEC encoder and 10:4 serializer and/or DAC and ADC function). There are many ways to design the functionality of the ASIC for the particular modulation characteristics and desired systems characteristics. Generally speaking one primary function for the ASIC and its inherent DSP processing is to demodulate the received optical signal and impose modulation on the transmitted optical signal. The ASIC also includes components to provide additional functionality that include, but are not limited to the ADC, bulk dispersion compensation, Polarization de-multiplexing (DMUX)/Polarization Mode Dispersion (PMD) (also called an adaptive equalizer), SD-FEC, phase synchronization, frequency synchronization, OSNR estimation, BER estimation, and serializer/deserializer modules.

Figure 5:
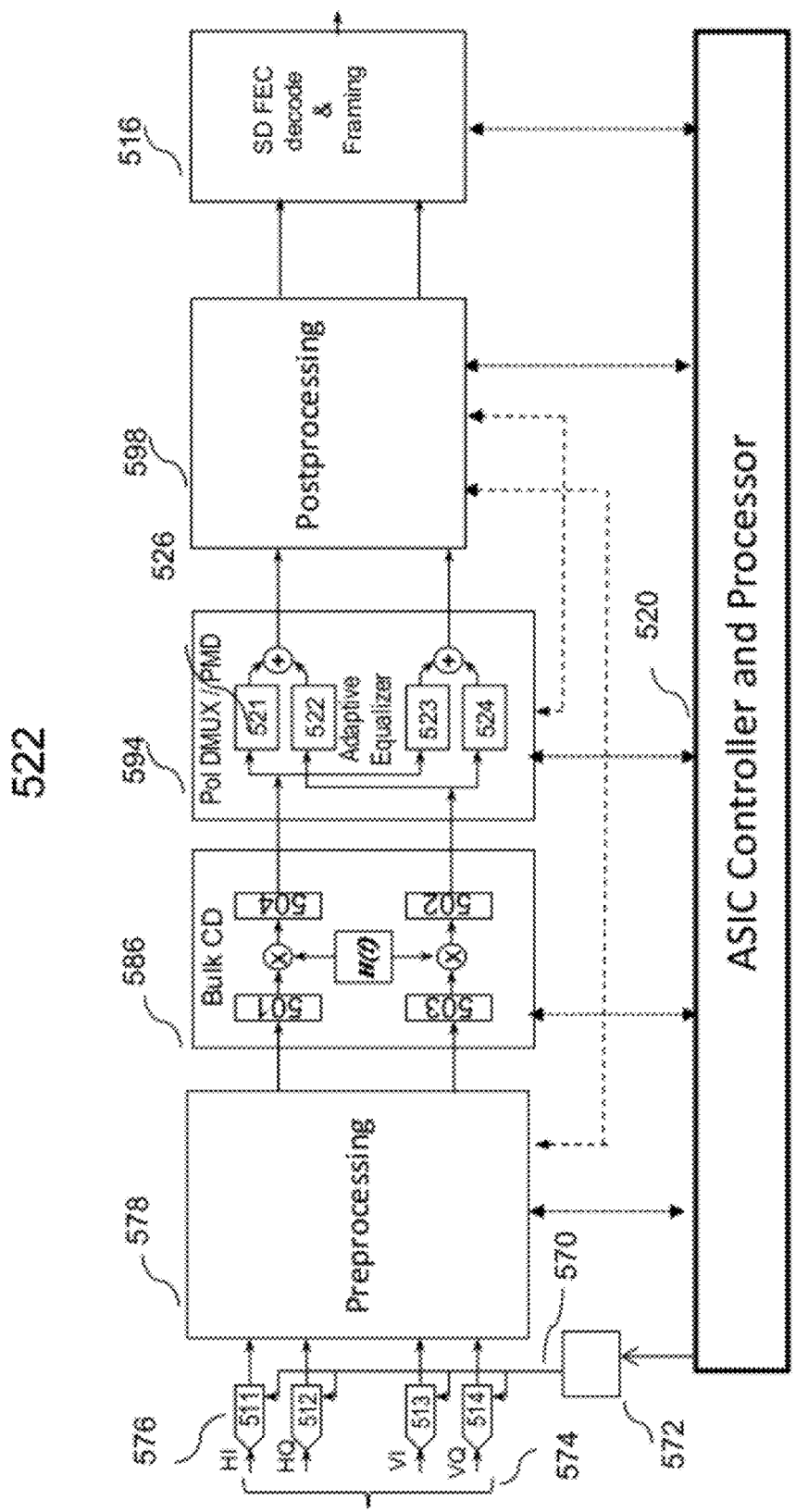
FIG. 5 is a diagram of an embodiment of a coherent DWDM transceiver module including signal processing and a built-in TWTT protocol system.

FIG. 5 represents a schematic view of basic operations included within the ASIC 522. Various functions performed within the ASIC are controlled and sequenced by the ASIC controller 520 which also includes data processing capability that are required for example in clock synchronization, etc. Referring now simultaneously to FIGS. 4 and 5, the four outputs from the 90 degree hybrid and photo detector shown in FIG. 4 collectively referred as 570 in FIG. 5, are input to high speed analog-to-digital converters (ADC) labeled as 511-514 that are collectively shown as 574 in FIG. 5. An ADC clock 572 is used to properly sequence the four components received from the photo detector prior to sending the outputs of the ADCs 574 to a pre-processing block 578 to remove imperfection resulting from transmission impairments that may have been introduced by some of the optical components in the transmit or receive chain.

The pre-processing block 578 performs a variety of functions which may include, but are not limited to transmit/receive frequency tracking, interpolation of new bits between original bits, optional estimation and adjustment of the two received polarizations, and other functions such as . . . decimation, phase recovering, etc. The output of the pre processing block 578 is sent to a bulk chromatic dispersion module 586 including elements 501-504 that remove on a per channel basis, the majority of the chromatic dispersion that occurs during transmission.

The output of the chromatic dispersion module 586 is sent to a Polarization Demultiplexer/Polarization Mode Dispersion (Polarization DMUX/PMD) module collectively shown as 594 (also known as an Adaptive Equalizer in the art), including individual elements 521-524 to operate on four streams of signals. This module descrambles the transmitter and receiver polarization alignment, optionally estimates the input state-of-polarization and amplitudes of each polarization, does additional fine tuning to the chromatic dispersion, and compensates for polarization mode dispersion.

The output of the Polarization DMUX/PMD module 594 is sent into a post processing block 598 which corrects other imperfections in the signal such as carrier frequency error, carrier phase error, symbol timing offset, non-linear compensation and other functions before being sent to a SD-FEC decoder 516. Each of the sub-modules is in communication with the ASIC controller 520. Components outside the ASIC 522 such as, the device controller 430 (FIG. 4) communicate with and control the ASIC 522 either through the ASIC controller 520 or through direct data busses (not shown in this view).

The examples described above in reference with FIGS. 4 and 5 depict a coherent receiver architecture designed for DP-QPSK modulation format and this invention includes this architecture and obvious extensions of this architecture for single-mode fiber transceivers or multi-mode fiber transceivers and other types of modulation formats mentioned earlier that are known to those skilled in the art. The principles described using these exemplary coherent optical receiver designs are incorporated in a transmission system for implementing clock synchronization using TWTT protocol described earlier in reference with FIGS. 2 and 3 for fault location and fiber security in transponders. Note the actual TWTT digital logic can be located inside the ASIC or using a separate digital circuit outside the ASIC but inside the transponder module, or can be done using logic outside the module.

Figure 6:
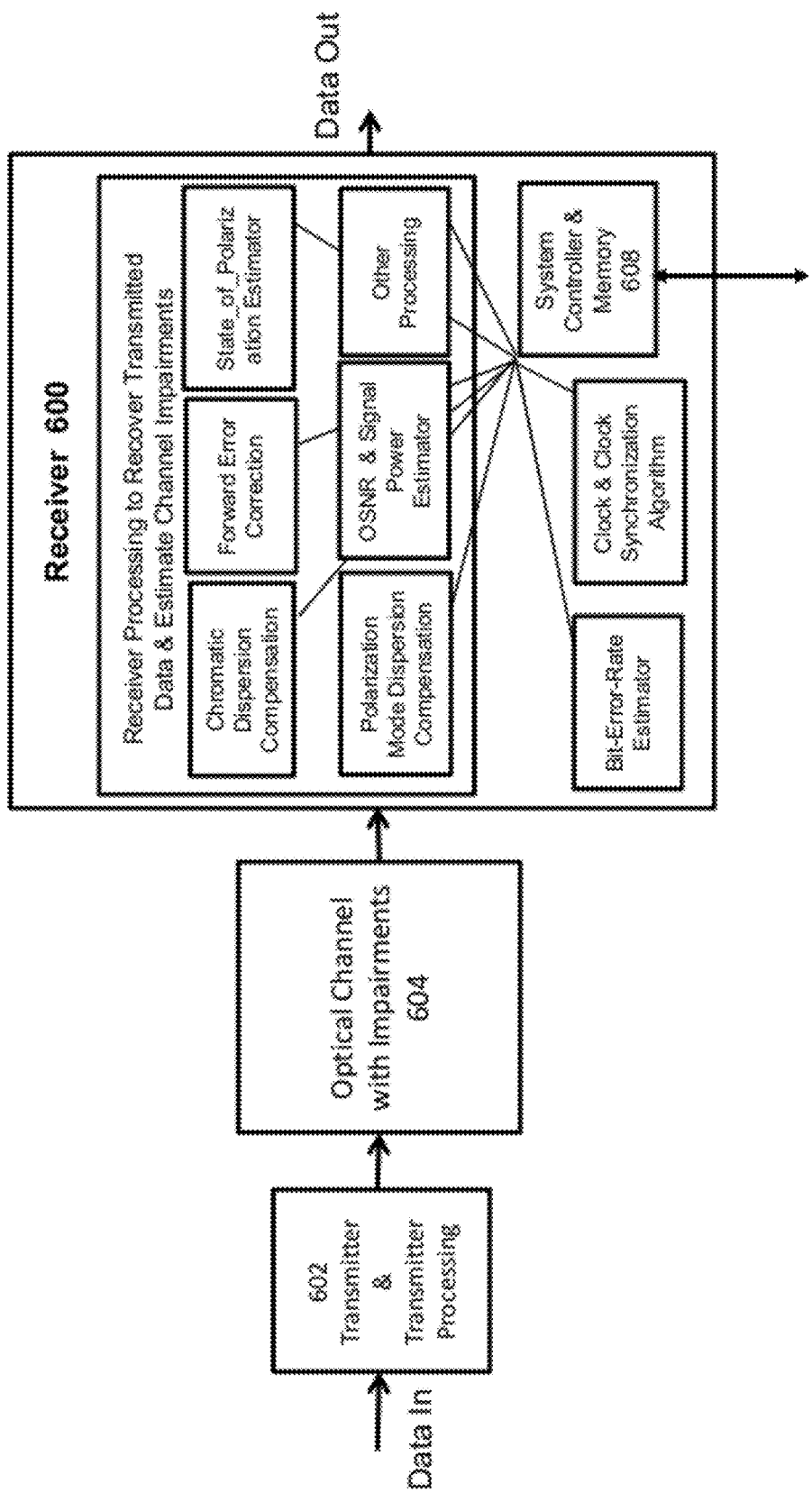
FIG. 6 is a diagram of an embodiment of a DSP architecture incorporated in the ASIC in accordance with this invention.

FIG. 6 shows some of the salient features of a transmission system 600 including transponders that are adapted to be used for fault localization. More specifically, a transmitter 602 is configured with integral transmitter processing functions that perform time stamp and time synchronization operations described earlier in reference with FIGS. 2 and 3.

One or more optical channels collectively represented as 604 may have natural impairments that may occur in normal course of transmission such as, chromatic dispersion, polarization mode dispersion, non-linear effects etc., or impairments arising due to man-made interruptions that may result from tampering, unintentionally or maliciously or simply due to external environmental conditions (a vehicle passing over a fiber or other man-made or natural disturbance near the fiber).

A typical coherent optical receiver 600 includes various analog or digital signal processing elements to estimate and correct for impairments. Impairments that are estimated and corrected for in a receiver include, but are not limited to chromatic dispersion, state-of-polarization, polarization-mode-dispersion, estimating of optical signal to noise ratio (OSNR), estimation of received optical signal power, channel bit-error-rate, received optical frequency, etc. There are other possible signal channel characteristics that are well known in the art, may be estimated and corrected using other methods know in the art.

One important aspect of this invention is not just that the receiver corrects for channel impairments but the receiver is also configured to report the state of channel corrections or predict or detect innocent or malicious security threats or faults that occur in the transmission link as has been described in reference with FIG. 3 (loss of transmission occurred due to fiber cut). The coherent optical receiver configured with sophisticated analog and/or DSP capabilities according to this invention detect and report impairments other than loss of light. More importantly, using the timing history, the receiver also determines the location of the impairments.

Returning to FIG. 3, assume a transmission link between Terminal 1 and Terminal 2 is stressed at an instant of time such that the loss in optical power from its normal permissible range is reported. This is not detected as a simple loss-of-light but may reflect in the OSNR or bit-error-ratio estimator. Following the procedure described earlier in reference with FIG. 3, by recording the history of a particular parameter for example OSNR or bit error ratio, using synchronized clocks from transponders at two ends of the link where the fiber stress occurred, the location of the fiber stress is detected and located.

Deterioration in quality of transmission due to stress in the link may occur due to natural or malicious event. One common example of a malicious event is where an eavesdropper splices into the communication stream along the optical fiber. There are many traditional ways this can be accomplished for example, by gaining access to an in-line amplifier output or mid-stage access or uncovering the actual fiber transmission cable and carefully pulling back the protective jackets and buffers and filing down the cladding to evanescently tap into the core. Such tampering is very hard to detect in a transmission system using a traditional transceiver thereby, rendering the communication not very secure.

However using aspects of this invention and in particular, a specially designed transceiver, the communication channel may be made more secure. Advantageously, the aspects of this invention may be implemented in traditional transceiver as well. For example, it is well known that if a single-mode optical fiber is tampered with, or attempted to file down the cladding to expose the core, dramatic changes occur in the state of polarization and other aspects of the transmitted light that may be measured in a coherent receiver designed according to this invention. In an attempt to eaves drop, if a person tries to gain access to the light in the fiber core the state of polarization will fluctuate drastically in a random fashion than fluctuations that occur in a normal transmission environment. Such changes may not be reflected easily in a traditional transmission link.

Using a coherent optical receiver configured with DSP capabilities described in reference with FIGS. 4 and 5 the state of polarization and optionally, other optical receiver parameters and functions are continuously recorded in a memory 608. The parameters may be processed in the receiver processor to determine unusual variations and deviations from permissible limits, or it may be processed at a remote processing unit for analysis. Any unusual changes in parameters in the optical receiver may be recorded and reported to a system controller in real-time or quasi real time, to detect and locate the source of impairment.

In one embodiment of the invention algorithms are continually run to detect natural or malicious changes to the optical channel(s). In the above example, if the state of receiver polarization begins rapidly changing and is statistically distinct from that normal background fluctuations an alarm can be propagated to the network management system (not shown). Detecting a natural or malicious event according to this invention is extremely valuable to the network operators. If an on-set of these fluctuations is distinct and the recorded time history is long enough the location determining algorithms described earlier in reference with FIGS. 2 and 3 may be used to determine exact nature and location of the natural or malicious intrusion.

There are many other aspects of this invention that enhance security and fault detection and localization. Some examples follow. If a malicious attempt to insert a section of fiber in order to split off a signal is made the present invention offers various options to detect this. Any interruption of the signal would trigger changes in the measured/monitored parameters including a loss-of-light, loss-of-power, loss-of-OSNR, an increase in BER and many other parameters. However it is possible that other events could mask the outage that occurs during a malicious fiber tampering for purposes of eaves dropping, spoofing, or jamming.

In one embodiment propagation delay is used to detect network tampering. For example, once the link has been restored a comparison of propagation delay values before and after an outage or, more generally, any significant change in propagation delay may be used as a metric to set an alarm to notify a network operator. For example a malicious user may insert equipment in-line on the fiber but such equipment may increase the total propagation delay and be detectable using the methods of this invention.

Another aspect of this invention is that often there is multiple fiber between two terminal nodes that are all carrying information from Terminal 1 to Terminal 2. In this situation it is not necessary that each link have the timing and fault detection and prediction circuitry mentioned above. For example, if a total fiber cable cut is the major source of concern for the network operator then just one duplex fiber communication pair may need this technology. In that situation it is not even necessary that the particular fiber pair be conveying external information (e.g. Data In and Data Out in FIG. 6). The fault detection circuitry could be optimized in size, cost, and functions if it did not have to carry data traffic. As described earlier, the timing synchronization that provides for optional fault location can be performed just once and distributed to all the transceivers or each transceiver can perform timing synchronization.

Another important aspect of this invention is particularly applicable in embodiments having multiple fibers between terminal pairs. If there are many fiber pairs transmitting information between terminals then a good set of statistical data can be recorded on each fiber pair. If there is a dramatic change in one fiber pair relative to the remaining other fiber pairs (which are undergoing normal environmental changes) at any instant of time, may be indicative of malicious tampering with a specific fiber.

One important aspect to note is that the existing data communication transceiver hardware may be built with at least a few additional components such as memory, a processor and a controller to perform time synchronization protocol (e.g. as shown in FIG. 4). Many transceivers used in coherent as well as non-coherent detection perform a myriad of tasks to correct impairments such as chromatic dispersion, PMD, etc. resulting from transmission. Much of the circuitry for correcting for fiber impairments may simply be modified to for reporting the current state of the transmission fiber impairments and changes in the state of the transmission fiber impairments at a marginal additional cost. The added value to the network operator in determining and locating a fault at very little additional cost to the transceiver and system design is extremely beneficial. Furthermore, by having fault detection on each fiber pair the security of every fiber pair in increased in the event of a malicious intruder.

Furthermore, the transceiver capability of acquiring and processing receiver parameter data over a long time generates statistical information and data patterns of various optical impairments that may be helpful in detecting and locating fault in the absence of multiple fibers between transponders. For example, the processing unit 608 generates statistical data regarding individual and joint probability statistics, densities, autocorrelation functions, and cross correlation functions under normal conditions. Acceptable bounds for probability of missed detection and probability of false alarms can be built up over time and when at any instant of time those thresholds exceed, an alarm can be sent to the network operator and the fault localization process can be run and reported as well.

Referring to FIGS. 1-3, if all the fibers are cut between a pair of terminals then out-of-fiber communication channel is needed to run the fault localization algorithm. As it is know it is quite common to have an out-of-band network management control plan and this plan can be used to perform the fault localization algorithm in the event of a complete fiber cut. One aspect of this invention is to use a TWTT protocol build into the optical transceivers and uses the time synchronized clocks to provide other service beyond fault isolation. An example could be that it is providing timing information for an external sensor that is performing localization of a RF signal or providing clocks for running other telecommunication equipment.

In an embodiment of the invention, a fiber network may be used as a distributed sensor to detect variation in environmental activities for security and surveillance applications. For example, an embedded transmission network in an area may be monitored continuously or periodically, for changes in transmission parameters using methods described earlier in reference with FIGS. 3, 4, 5 and 6. By measuring different transmission parameters of the transmission network, a statistical data base may be generated and an acceptable range of parameters may be determined and communicated between one or more transponders located at the end points of each transmission link using TWTT protocols. The Any unusual data patterns which may be indicative of trespassing for example by a vehicular or a human activities, can then be tracked to a geographical location using the methods described in this invention.

While a broad framework of the present invention is described in terms of certain exemplary preferred embodiments, it will be readily understood and appreciated by one of ordinary skill in the art that it is not so limited, and that many combinations and sub-combinations of the preferred embodiments may be configured within the scope of the invention as hereinafter claimed. Accordingly, the scope of the invention is limited only by the scope of the appended claims.

What is claimed is:

1. An apparatus communicatively coupled to an external device via an optical transmission link, the apparatus comprising:
   a first clock;
   a processor; and
   a transceiver including:
      at least one optical transmitter; and
      at least one optical receiver;
   wherein the processor is configured to:
      obtain a time history of one or more parameters of the optical transmission link, the time history comprising a plurality of values of a first parameter of the one or more parameters and a corresponding plurality of times at which the plurality of values were obtained by the apparatus according to the first clock;
      detect, using the time history, occurrence of a fault in the optical transmission link at a location between the apparatus and the external device; and
      determine, using the time history, a distance from the apparatus to the location of the fault in the optical transmission link,
   wherein the external device comprises a second clock;
   wherein the time history includes a second plurality of values of the first parameter and a corresponding second plurality of times at which the second plurality of values were obtained by the external device according to the second clock; and
   wherein the processor is configured to determine the distance from the apparatus to the location of the fault using the first plurality of times and the second plurality of times.

2. The apparatus of claim 1, wherein the first parameter is selected from the group consisting of loss-of-light, loss-of-power, signal to noise ratio, bit error rate, polarization, and propagation delay.

3. The apparatus of claim 1, wherein the optical transmission link is a unidirectional link.

4. The apparatus of claim 1, wherein the first parameter provides an indication of polarization mode dispersion.

5. The apparatus of claim 1, wherein the first parameter provides an indication of chromatic dispersion.

6. The apparatus of claim 1, wherein the at least one optical receiver comprises a coherent receiver.

7. An apparatus communicatively coupled to an external device via an optical transmission link, the apparatus comprising:
   a first clock;
   a processor; and
   a transceiver including:
      at least one optical transmitter; and
      at least one optical receiver;
   wherein the processor is configured to:
      obtain a time history of one or more parameters of the optical transmission link, the time history comprising a plurality of values of a first parameter of the one or more parameters and a corresponding plurality of times at which the plurality of values were obtained by the apparatus according to the first clock;
      detect, using the time history, occurrence of a fault in the optical transmission link at a location between the apparatus and the external device; and
      determine, using the time history, a distance from the apparatus to the location of the fault in the optical transmission link,
   wherein the apparatus is further configured to synchronize time kept by the first clock and time kept by a second clock in the external device at least in part by:
      transmitting a first signal to the external device using the at least one optical transmitter, the first signal indicating a first time obtained using the first clock;
      receiving a second signal from the external device using the at least one optical receiver, the second signal indicating a second time obtained using the second clock independently of the first time; and
      determining, using the processor, an amount of time by which the second clock differs from the first clock based, at least in part, on the first time and the second time.

8. The apparatus of claim 7, further configured to perform:
   receiving a third signal from the external device using the at least one optical receiver, the third signal indicating a third time obtained using the second clock, the third time indicating when the external device received the first signal;
   obtaining, using the first clock, a fourth time indicating when the apparatus received the second signal; and
   determining, using the processor, the amount of time by which the second clock differs from the first clock further based on the third time and the fourth time.

9. The method of claim 7, wherein the first parameter is selected from the group consisting of loss-of-light, loss-of-power, signal to noise ratio, bit error rate, polarization, and propagation delay.

10. The apparatus of claim 7, wherein the first parameter provides an indication of polarization mode dispersion.

11. The apparatus of claim 7, wherein the first parameter provides an indication of chromatic dispersion.

12. The apparatus of claim 7, wherein the at least one optical receiver comprises a coherent receiver.

13. A method of detecting a location of a fault in an optical transmission link in a communication system comprising a first transceiver connected to a first end of the optical transmission link and a second transceiver connected to a second end of the optical transmission link, the first transceiver comprising a first clock, the second transceiver comprising a second clock, the method comprising:
   obtaining a time history of one or more parameters of the optical transmission link, the time history comprising a plurality of values of a first parameter of the one or more parameters and a corresponding plurality of times at which the plurality of values were obtained by the first transceiver according to the first clock;
   detecting, using the time history, occurrence of a fault in the optical transmission link at a location between the first transceiver and the second transceiver; and
   determining, using the time history, a distance from the first transceiver to the location of the fault in the optical transmission link between the first transceiver and the second transceiver,
   wherein the time history includes a second plurality of values of the first parameter and a corresponding second plurality of times at which the second plurality of values were obtained by the second transceiver according to the second clock, and wherein the distance from the apparatus to the location of the fault is determined using the first plurality of times and the second plurality of times.

14. The method of claim 13, wherein the optical transmission link is a bidirectional link.

15. The method of claim 13, wherein the first parameter provides an indication of polarization mode dispersion.

16. The method of claim 13, wherein the first parameter provides an indication of chromatic dispersion.

17. A method of detecting a location of a fault in an optical transmission link in a communication system comprising a first transceiver connected to a first end of the optical transmission link and a second transceiver connected to a second end of the optical transmission link, the first transceiver comprising a first clock, the second transceiver comprising a second clock, the method comprising:

obtaining a time history of one or more parameters of the optical transmission link, the time history comprising a plurality of values of a first parameter of the one or more parameters and a corresponding plurality of times at which the plurality of values were obtained by the first transceiver according to the first clock;

detecting, using the time history, occurrence of a fault in the optical transmission link at a location between the first transceiver and the second transceiver; and determining, using the time history, a distance from the first transceiver to the location of the fault in the optical transmission link between the first transceiver and the second transceiver, wherein the method further comprises synchronizing the first clock and the second clock before determining the distance from the first transceiver to the location of the fault, the synchronizing further comprising:

transmitting a first signal to the second transceiver using the first transceiver, the first signal indicating a first time obtained using the first clock;

receiving a second signal from the second transceiver using the first transceiver, the second signal indicating a second time obtained using the second clock independently of the first time; and determining an amount of time by which the second clock differs from the first clock based, at least in part, on the first time and the second time.

18. The method of claim 17, further comprising:

receiving a third signal from the second transceiver using the first transceiver, the third signal indicating a third time obtained using the second clock, the third time indicating when the second transceiver received the first signal;

obtaining, using the first clock, a fourth time indicating when the first transceiver received the second signal; and determining the amount of time by which the second clock differs from the first clock further based on the third time and the fourth time.

19. The method of claim 17, wherein the first parameter provides an indication of polarization mode dispersion.

20. The method of claim 17, wherein the first parameter provides an indication of chromatic dispersion.

* * * * *